US006052390A

United States Patent [19]

Deliot et al.

[11] Patent Number: 6,052,390

[45] Date of Patent: Apr. 18, 2000

[54] DATA CODE BLOCK TRANSMISSION USING PRESELECTED CONTROL SIGNALS AND DELIMITERS

[75] Inventors: Eric Henri Ulysse Deliot; Miranda Jane Felicity Mowbray, both of Bristol; Alistair Neil Coles, Bath; Simon Edwin Crouch, Chippenham, all of United Kingdom

[73] Assignee: Hewlett-Packard Company, Palo Alto, Calif.

[21] Appl. No.: 08/930,105

[22] PCT Filed: Mar. 11, 1997

[86] PCT No.: PCT/GB97/00666

§ 371 Date: Nov. 10, 1997

§ 102(e) Date: Nov. 10, 1997

[87] PCT Pub. No.: WO97/34397

PCT Pub. Date: Sep. 18, 1997

[30] Foreign Application Priority Data

Mar. 11, 1996 [GB] United Kingdom ................... 9605086
Mar. 11, 1996 [GB] United Kingdom ................... 9605087

[51] Int. Cl.[7] ............................ H04J 3/12; H03M 13/00; H03M 5/02

[52] U.S. Cl. ............................ 370/528; 714/752; 341/56

[58] Field of Search .............................. 341/56; 370/419, 370/420, 463, 465, 466, 522, 528; 714/752, 776, 775; 371/37.01, 37.02, 42

[56] References Cited

U.S. PATENT DOCUMENTS

| | | | |
|---|---|---|---|
| 4,486,739 | 12/1984 | Franaszek et al. . | |
| 4,811,361 | 3/1989 | Bacou et al. | 375/242 |
| 5,280,500 | 1/1994 | Mazzola et al. | 375/286 |
| 5,438,571 | 8/1995 | Albrecht et al. | 370/408 |
| 5,625,644 | 4/1997 | Myers | 714/752 |

FOREIGN PATENT DOCUMENTS

| | | |
|---|---|---|
| 0367093A2 | 10/1989 | European Pat. Off. . |
| 0584865A1 | 8/1993 | European Pat. Off. . |
| 2121653 | 5/1993 | United Kingdom . |
| WO 92/09162 | 5/1992 | WIPO . |
| WO 92/22160 | 12/1992 | WIPO . |
| WO97/34397 | 3/1997 | WIPO . |

OTHER PUBLICATIONS

IBM J. Research Develop., vol. 27, No. 5, Sep. 1983, pp. 441–451, A. X. Widmer et al., “A DC–Balanced, Partitioned–Block, 8B/10B Transmission Code”.

IEEE Transactions on Communications, vol. 42, No. 2/3/4, Feb./Mar./Apr. 1994, pp. 1400–1408, Seok Chang Kim et al., “Synchronization of Shift Register Generators in Distributed Sample Scramblers”.

International Search Report, Jul. 7, 1997, PCT/GB 97/00666.

IEEE Proceedings–I, vol. 138, No. 3, Jun. 1991, J. K. Pollard, “Multilevel Data Communication Over Optical Fibre”.

*Primary Examiner*—Michael Horabik
*Assistant Examiner*—Kevin C. Harper

[57] ABSTRACT

Data are transmitted in blocks over a channel together with control signals for coordinating access to the channel. The control signals have the same values as some of the data blocks, these values being selected so that the control signals are spaced throughout the population of data block values and so that there is a greater Hamming distance between the control signal values than between the data signals. The control signals are transmitted between delimiter signals which differ from any of the data block signals, and are passed through a scrambling and encoding system in the same way as data signals, so that the spectrum of radiated electromagnetic emissions from the channel is not affected by the control signals.

20 Claims, 4 Drawing Sheets

000 C'TRL
DATA
CONTROL / DATA
MULTIPLEXER
20
SCRAMBLER
22
000
CONTROL / DATA
MUX
28
8B3N ENCODER
30
CONTROL / DATA
INSERT DELIMITERS/ ERROR DETECTION CODEWORDS
32
12
D/A CONVERTER
34
16
TWISTED PAIR
EQUALIZER
40
A/D CONVERTER
42
14
CONTROL / DATA
ERROR DETECTION
44
DELIMITER DETECTION
8B3N DECODER
46
DESCRAMBLER
48
CONTROL / DATA
DEMULTIPLEXER
50
XXX C'TRL
DATA 0 0 0 0 C'TRL
DATA
CONTROL / DATA
MULTIPLEXER
20
130
CONTROL SUBSET TOGGLE
SCRAMBLER
22
0 0 0
CONTROL / DATA
MUX
128
8B3N ENCODER
30
CONTROL / DATA
INSERT DELIMITERS/ ERROR DETECTION CODEWORDS
32
12
D/A CONVERTER
34
16
TWISTED PAIR
EQUALIZER
40
A/D CONVERTER
42
14
CONTROL / DATA
ERROR DETECTION
44
DELIMITER DETECTION
8B3N DECODER
46
DESCRAMBLER
48
CONTROL / DATA
DEMULTIPLEXER
50
XXXX C'TRL
DATA

DATA CODE BLOCK TRANSMISSION USING PRESELECTED CONTROL SIGNALS AND DELIMITERS

TECHNICAL FIELD

This invention relates to apparatus and methods for communicating data, and particularly, though not exclusively, to apparatus and methods for communicating data over a plurality of channels, such as a cable having a plurality of conductors (for example, four twisted pairs of wires), and for encoding and/or decoding data, for example in connection with such communications.

BACKGROUND ART

The spread of personal computers and workstations has led to the development of networks for interconnecting such equipment and common resources such as printers and data storage devices. More powerful and sophisticated computing equipment and programs have progressively become available, allowing the processing of data in larger and larger quantities, for example in the form of database information and graphic images. These developments have in turn placed increasing demands on the speed and capacity of networks.

Various new networking technologies have been proposed to cater for these demands. One recent proposal has been established as IEEE Standard 802.12, and is also known as 100VG-AnyLAN. This technology, which transfers data at 100 megabits/s (Mb/s), involves splitting a data frame to be transmitted into consecutive blocks of five bits each, encoding the blocks using a 5B6B code, and distributing the encoded blocks among four twisted-pair conductors on a cyclic basis.

Although networks based on this technology are being deployed and meet current requirements, it is envisaged that future computing developments will eventually require even higher-speed and thus higher-capacity networks. However, to minimize the costs involved it is desirable to continue to use the same kind of cabling infrastructure as is being used for current networks. However, the use of such infrastructures requires conformance with strict regulatory limits on the level of radiated electromagnetic emissions having frequencies above 30 MHz. Simply increasing the bit rate of existing networking systems, for example, would result in unacceptable levels of such emissions.

It is an object of this invention to provide apparatus and methods for communicating data at data rates in excess of 100 Mb/s, using similar conductors to those now in use and conforming to regulatory requirements.

DISCLOSURE OF INVENTION

According to one aspect of this invention there is provided apparatus for transmitting blocks of data over a channel together with control signals coordinating access to said channel, said control signals being transmitted between delimiter signals different from any of said data block input signals, and said control signals being preselected from the possible values of said data blocks so that said control signals are spaced throughout the population of said possible values such that there is greater Hamming distance between said control signals than between said data signals.

According to another aspect of this invention there is provided apparatus for transmitting blocks of data over a channel together with control signals coordinating access to said channel, comprising:

scrambler means for receiving and reversibly scrambling data block input signals;

encoding means coupled to the scrambler means for deriving a code block for each respective scrambled data block in accordance with a code;

transmission means coupled to the encoding means for transmitting code blocks over said channel;

control means for generating control signals and supplying said control signals to said scrambler means, said control signals being preselected ones of possible values of said data blocks; and control means coupled to the transmission means and the encoding means for supplying encoded control signals to the transmission means between delimiter signals different from any of said data block input signals in scrambled and encoded form.

According to a further aspect of this invention there is provided a method for transmitting blocks of data over a channel together with control signals coordinating access to said channel, said control signals being transmitted between delimiter signals different from any of said data block input signals, and said control signals being preselected from the possible values of said data blocks so that said control signals are spaced throughout the population of said possible values such that there is greater Hamming distance between said control signals than between said data signals.

According to another aspect of this invention there is provided a method for transmitting blocks of data over a channel together with control signals coordinating access to said channel, comprising the steps of:

receiving and reversibly scrambling data block input signals;

deriving a code block for each respective scrambled data block in accordance with a code;

transmitting code blocks over said channel;

generating control signals, said control signals being preselected ones of possible values of said data blocks; and supplying encoded control signals to the transmission means between delimiter signals different from any of said data block input signals in scrambled and encoded form.

BRIEF DESCRIPTION OF DRAWINGS

Apparatus and methods in accordance with this invention for communicating data using unshielded twisted-pair cable will now be described, by way of example, with reference to the accompanying drawings, in which.

BEST MODE FOR CARRYING OUT THE INVENTION, & INDUSTRIAL APPLICABILITY

Figure 1:
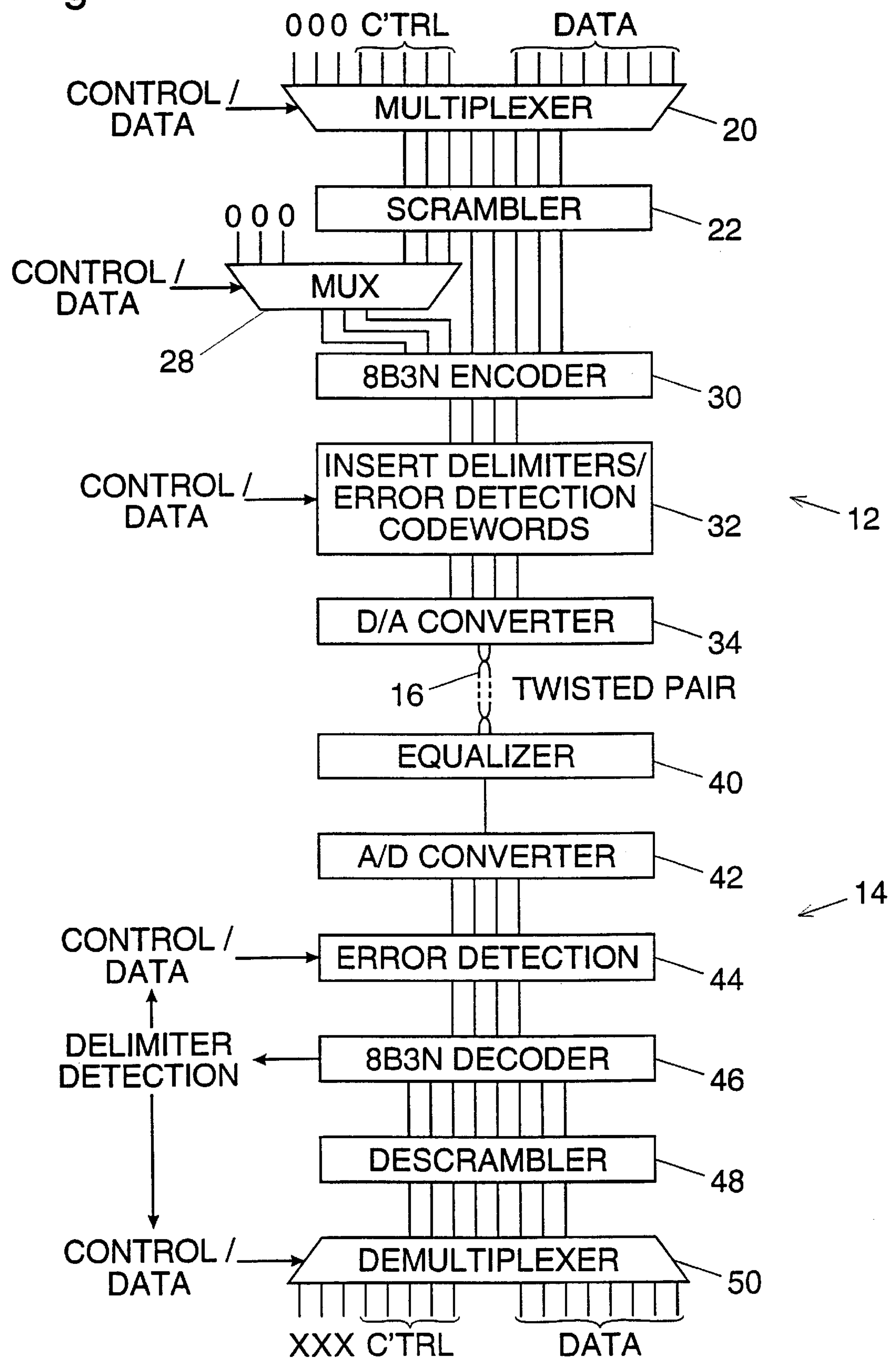
FIG. 1 is a block schematic diagram of a form of the apparatus.

FIG. 1 shows an apparatus for communicating data at rates in excess of 100Mb/s over Category 5 unshielded twisted-pair (UTP) cable, as defined in ISO/IEC 11801:1995. This apparatus enables data communication at these rates to be achieved whilst still conforming to regulatory requirements on levels of radiated electromagnetic emissions. The apparatus is particularly well suited to use in implementing a demand priority protocol for shared use of a communications medium, of the kind disclosed in U.S. Pat. No. 5 438 571. The system disclosed therein operates at a data rate of 100Mb/s over four-conductor UTP cable; the present apparatus enables even higher data rates to be achieved over Category 5 cabling. In this connection, the apparatus provides for the communication both of data and of control signals which are used in the demand priority protocol to coordinate access to the communications medium and operation of the circuitry contained in the apparatus.

Referring to FIG. 1, the apparatus comprises a transmitter section 12 and a receiver section 14, linked by a communications channel comprising a single Category 5 UTP conductor 16. Data are shown as comprising eight-bit words, and for clarity each block is represented as receiving multiple bits in parallel. In practice some functions may be implemented in a bitwise serial manner (as described below, for example, in relation to the scrambling of data words). In addition, the processing of a particular data word need not occur in a strictly chronological sequence of separate steps corresponding to the sequence of blocks shown in the drawing. Thus delimiter detection in the receiver section 14 and consequent selection of error detection mechanism (also described below) may affect contemporaneously received blocks; for this purpose buffer memory may be provided in some blocks as necessary.

The transmitter section 12 contains a multiplexer 20 with two inputs for receiving eight-bit data words and control words respectively, and for selecting signals on one of these two inputs in accordance with a CONTROL/DATA selection signal. The control words have only five active bits, and the remaining three most significant bits are forced to a value of zero.

Figure 2:
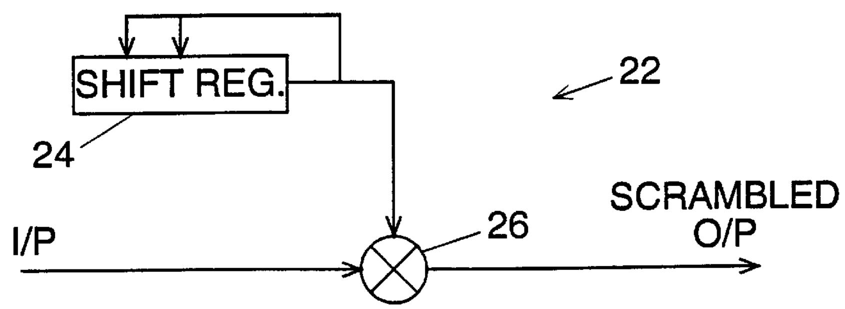
FIG. 2 is a block diagram of a side-stream scrambler included in the apparatus of FIG. 1.

The selected input word to the multiplexer is passed to a side-stream scrambler 22. Typical data traffic on a communications network includes patterns that are simply repetitive ones or zeros. Likewise, control words may remain unchanged for extended periods of time, leading to repetition of the same words. If these repetitions were transmitted over the conductor 16, a large proportion of the transmitted energy would be concentrated at relatively few frequencies, resulting in problems with radiated emissions. The scrambler 22 provides a reversible randomization of the transmitted bit pattern, by combining the data and control word stream with a pseudo-random bit sequence. As shown in FIG. 2, this pseudo-random bit sequence is generated in a shift register 24 which is loaded with a predefined starting pattern. As each bit of the data and control word stream is received, the contents of the shift register are shifted by one position. The value in the output stage of the shift register is fed back to selected earlier stages, in each of which it is combined with the value from the preceding stage in an exclusive-OR gate (not shown) to produce the desired pseudo-random sequence. The output value is also supplied to an exclusive-OR gate 26 for combination with the current bit of the data and control word stream to produce the scrambled bit stream.

Referring again to FIG. 1, the three most significant bits of the scrambled bit stream are supplied to a second multiplexer 28 having a second three-bit input receiving a fixed zero value. When the CONTROL/DATA selection signal indicates that data are being transmitted, the output of the scrambler is selected while the relevant bits are being provided by the exclusive-OR gate 26, whereas the fixed zero value is used for those bits in the case of control words.

The five least significant bits of the scrambler output and the output of the multiplexer 28 are fed to an eight-bit/three-nonary-symbol (8B3N) encoder 30. This encoder translates each eight-bit scrambled word into a corresponding code word of three symbols in an 8B3N block code, where each symbol can have any one of nine possible values. These nine possible symbol values will be represented on the twisted pair conductor 16 by nine different voltage levels (measured between the two wires of the twisted conductor pair), one level being zero, four being positive and four negative. For convenience these symbols and the corresponding voltage levels will be represented here by the arbitrary numerical values −4, −3, −2, −1, 0, +1, +2, +3 and +4; the actual voltages may be numerically different from these values, and may be chosen to satisfy practical requirements involving, for example, power dissipation and noise margins.

The actual output of the encoder 30 is a sequence of four-bit words or nibbles, each nibble having one of nine possible values (e.g. 0000, 0001, 0010, 0011, 0100, 0101, 0110, 0111 and 1000) representing the nine possible nonary symbols, and successive triplets of nibbles defining the three symbols comprising the code word for the corresponding eight-bit word supplied to the encoder 30.

The sequence of four-bit nibbles produced by the encoder 30 is fed to an insertion module 32 which inserts additional nibbles (i.e. symbols) representing delimiters before and after control-word symbol triplets, and error detection symbols in association with sequences of data-word symbols. To this end the insertion module 32 receives a CONTROL/DATA input signal in the same manner as the multiplexers 20 and 28.

The 8B3N code and the operation of the encoder 30 and the insertion module 32 will be described in more detail below.

The nibble sequence output by the insertion module 32 is supplied to a digital-to-analogue converter (D/A Converter) 34, which produces a respective voltage level for each different symbol value and applies this voltage level to the twisted-pair conductor 16. Alternatively, further processing of the nibble sequence, for example digital filtering, is allowed before it is supplied to the D/A Converter 34. Similarly, further processing of the output of the D/A Converter, for example analogue filtering, is allowed before it is applied to the twisted-pair conductor 16.

The receiver 14 receives these voltages levels in an equalizer 40, which compensates for the effects of different conductor lengths on distortion affecting the received signals. The compensated signal produced by the equalizer 40 is supplied to an analogue-to-digital converter (A/D Converter) 42 (or an alternative form of decision circuit) which generates one of the nine possible nibble values 0000 to 1000 corresponding to the voltage level closest to that present at the output of the equalizer 40 for each successive symbol period. In this respect the receiver 14 incorporates a clock recovery circuit (not shown), such as a phase-locked loop, to enable the symbol periods to be identified in the received signal.

The sequence of nibbles generated by the A/D Converter 42 is passed to an error detection module 44, which, as described below, removes and checks the error detection symbols inserted by the insertion module 32 in association with data-word symbols, and checks the delimiters and associated control-word symbols. Errors detected by this module are used to correct errors if possible, or request retransmission of the affected data and control signals.

The remaining nibbles are supplied to an 8B3N decoder 46 which checks that the received encoded symbols are valid, and reverses the encoding performed by the encoder 30. This decoder also recognizes the delimiter nibbles and accordingly generates a CONTROL/DATA selection signal for the receiver 14, supplied to the error detection module 44.

The decoded eight-bit words are fed to a descrambler 48 which operates in the same manner as the scrambler 22 to produce the same pseudo-random bit sequence; this sequence is combined with the decoded words to reverse the scrambling effected in the transmitter 12, and recover the original data and control words. The recovered words are separated into respective control and data word streams by a demultiplexer 50 under the control of the CONTROL/DATA selection signal from the decoder 46. In the case of the control words the three most significant bits of the output from the demultiplexer 50 are ignored.

An example of an 8B3N code implemented in the encoder 30 is shown in Table 1 below:

TABLE 1

| Byte | Code | | | Wt |
|---|---|---|---|---|
| 0 | 2 | −4 | 2 | 0 |
| 1 | 2 | −3 | 1 | 0 |
| 2 | 2 | −2 | 0 | 0 |
| 3 | 2 | −1 | −1 | 0 |
| 4 | 2 | 0 | −2 | 0 |
| 5 | 2 | 1 | −3 | 0 |
| 6 | 2 | 2 | A | 0 |
| 7 | 3 | −4 | 1 | 0 |
| 8 | 1 | −4 | 3 | 0 |
| 9 | 1 | −3 | 2 | 0 |
| 10 | 1 | −2 | 1 | 0 |
| 11 | 1 | −1 | 0 | 0 |
| 12 | 1 | 0 | −1 | 0 |
| 13 | 1 | 1 | −2 | 0 |
| 14 | 1 | 2 | −3 | 0 |
| 15 | 1 | 3 | −4 | 0 |
| 16 | 0 | −4 | 4 | 0 |
| 17 | 0 | −3 | 3 | 0 |
| 18 | 0 | −2 | 2 | 0 |
| 19 | 0 | −1 | 1 | 0 |
| 20 | 0 | 4 | −4 | 0 |
| 21 | 0 | 1 | −1 | 0 |
| 22 | 0 | 2 | −2 | 0 |
| 23 | 0 | 3 | −3 | 0 |
| 24 | −1 | −3 | 4 | 0 |
| 25 | −1 | −2 | 3 | 0 |
| 26 | −1 | −1 | 2 | 0 |
| 27 | −1 | 0 | 1 | 0 |
| 28 | −1 | 1 | 0 | 0 |
| 29 | −1 | 2 | −1 | 0 |
| 30 | −1 | 3 | −2 | 0 |
| 31 | −1 | 4 | −3 | 0 |
| 32 | −2 | −2 | 4 | 0 |
| 33 | −2 | −1 | 3 | 0 |
| 34 | −2 | 0 | 2 | 0 |
| 35 | −2 | 1 | 1 | 0 |
| 36 | −2 | 2 | 0 | 0 |
| 37 | −2 | 3 | −1 | 0 |
| 38 | −2 | 4 | −2 | 0 |
| 39 | 2 | 0 | 2 | 4 |
| 40 | −3 | −1 | 4 | 0 |
| 41 | −3 | 0 | 3 | 0 |
| 42 | −3 | 1 | 2 | 0 |
| 43 | −3 | 2 | 1 | 0 |
| 44 | −3 | 3 | 0 | 0 |
| 45 | −3 | 4 | −1 | 0 |
| 46 | 1 | 0 | 3 | 4 |
| 47 | 2 | 0 | 3 | 5 |
| 48 | −4 | 0 | 4 | 0 |
| 49 | −3 | 0 | 4 | 1 |
| 50 | −2 | 0 | 4 | 2 |
| 51 | −1 | 0 | 4 | 3 |
| 52 | 0 | 0 | 4 | 4 |
| 53 | 1 | 0 | 4 | 5 |

TABLE 1-continued

| Byte | Code | | | Wt |
|---|---|---|---|---|
| 54 | 2 | 0 | 4 | 6 |
| 55 | −4 | 4 | 0 | 0 |
| 56 | −4 | 1 | 4 | 1 |
| 57 | −3 | 1 | 4 | 2 |
| 58 | −2 | 1 | 4 | 3 |
| 59 | −1 | 1 | 4 | 4 |
| 60 | 0 | 1 | 4 | 5 |
| 61 | 1 | 1 | 4 | 6 |
| 62 | 2 | 1 | 4 | 7 |
| 63 | 3 | 1 | 4 | 8 |
| 64 | 3 | −4 | 2 | 1 |
| 65 | 3 | −3 | 1 | 1 |
| 66 | 3 | −2 | 0 | 1 |
| 67 | 3 | −1 | −1 | 1 |
| 68 | 3 | 0 | −2 | 1 |
| 69 | 3 | 1 | −3 | 1 |
| 70 | 3 | 2 | −4 | 1 |
| 71 | 3 | −3 | 0 | 0 |
| 72 | 2 | −4 | 3 | I |
| 73 | 2 | −3 | 2 | 1 |
| 74 | 2 | −2 | 1 | 1 |
| 75 | 2 | −1 | 0 | 1 |
| 76 | 2 | 6 | −1 | 1 |
| 77 | 2 | 1 | −2 | 1 |
| 78 | 2 | 2 | −3 | 1 |
| 79 | 2 | 3 | −4 | 1 |
| 80 | 1 | −4 | 4 | 1 |
| 81 | 1 | −3 | 3 | 1 |
| 82 | 1 | −2 | 2 | 1 |
| 83 | 1 | −1 | 1 | 1 |
| 84 | 1 | 4 | −4 | 1 |
| 85 | 1 | 1 | −1 | 1 |
| 86 | 1 | 2 | −2 | 1 |
| 87 | 1 | 3 | −3 | 1 |
| 88 | 0 | −3 | 4 | 1 |
| 89 | 0 | −2 | 3 | 1 |
| 90 | 0 | −1 | 2 | 1 |
| 91 | 0 | 0 | 1 | 1 |
| 92 | 0 | 1 | 0 | 1 |
| 93 | 0 | 2 | −1 | 1 |
| 94 | 0 | 3 | −2 | 1 |
| 95 | 0 | 4 | −3 | 1 |
| 96 | −1 | −2 | 4 | 1 |
| 97 | −1 | −1 | 3 | 1 |
| 98 | −1 | 0 | 2 | 1 |
| 99 | −1 | 1 | 1 | 1 |
| 100 | −1 | 2 | 0 | 1 |
| 101 | −1 | 3 | −1 | 1 |
| 102 | −1 | 4 | −2 | 1 |
| 103 | 2 | 1 | 1 | 4 |
| 104 | −2 | −1 | 4 | 1 |
| 105 | −2 | 0 | 3 | 1 |
| 106 | −2 | 1 | 2 | 1 |
| 107 | −2 | 2 | 1 | 1 |
| 108 | −2 | 3 | 0 | 1 |
| 109 | −2 | 4 | −1 | 1 |
| 110 | 1 | 1 | 2 | 4 |
| 111 | 2 | 1 | 2 | 5 |
| 112 | −4 | 1 | 3 | 0 |
| 113 | −3 | 1 | 3 | 1 |
| 114 | −2 | 1 | 3 | 2 |
| 115 | −1 | 1 | 3 | 3 |
| 116 | 0 | 1 | 3 | 4 |
| 117 | 1 | 1 | 3 | 5 |
| 118 | 2 | 1 | 3 | 6 |
| 119 | −3 | 4 | 0 | 1 |
| 120 | −4 | 2 | 3 | 1 |
| 121 | −3 | 2 | 3 | 2 |
| 122 | −2 | 2 | 3 | 3 |
| 123 | −1 | 2 | 3 | 4 |
| 124 | 0 | 2 | 3 | 5 |
| 125 | 1 | 2 | 3 | 6 |
| 126 | 2 | 2 | 3 | 7 |
| 127 | 3 | 2 | 3 | 8 |
| 128 | 4 | −4 | 2 | 2 |
| 129 | 4 | −3 | 1 | 2 |
| 130 | 4 | −2 | 0 | 2 |

TABLE 1-continued

| Byte | Code | | | Wt |
|---|---|---|---|---|
| 131 | 4 | −1 | −1 | 2 |
| 132 | 4 | 0 | −2 | 2 |
| 133 | 4 | 1 | −3 | 2 |
| 134 | 4 | 2 | −4 | 2 |
| 135 | 3 | −2 | −1 | 0 |
| 136 | 3 | −4 | 3 | 2 |
| 137 | 3 | −3 | 2 | 2 |
| 138 | 3 | −2 | 1 | 2 |
| 139 | 3 | −1 | 0 | 2 |
| 140 | 3 | 0 | −1 | 2 |
| 141 | 3 | 1 | −2 | 2 |
| 142 | 3 | 2 | −3 | 2 |
| 143 | 3 | 3 | −4 | 2 |
| 144 | 2 | −4 | 4 | 2 |
| 145 | 2 | −3 | 3 | 2 |
| 146 | 2 | −2 | 2 | 2 |
| 147 | 2 | −1 | 1 | 2 |
| 148 | 2 | 4 | −4 | 2 |
| 149 | 2 | 1 | −1 | 2 |
| 150 | 2 | 2 | −2 | 2 |
| 151 | 2 | 3 | −3 | 2 |
| 152 | 1 | −3 | 4 | 2 |
| 153 | 1 | −2 | 3 | 2 |
| 154 | 1 | −1 | 2 | 2 |
| 155 | 1 | 0 | 1 | 2 |
| 156 | 1 | 1 | 0 | 2 |
| 157 | 1 | 2 | −1 | 2 |
| 158 | 1 | 3 | −2 | 2 |
| 159 | 1 | 4 | −3 | 2 |
| 160 | 0 | −2 | 4 | 2 |
| 161 | 0 | −1 | 3 | 2 |
| 162 | 0 | 0 | 2 | 2 |
| 163 | 0 | 1 | 1 | 2 |
| 164 | 0 | 2 | 0 | 2 |
| 165 | 0 | 3 | −1 | 2 |
| 166 | 0 | 4 | −2 | 2 |
| 167 | 2 | 2 | 0 | 4 |
| 168 | −1 | −1 | 4 | 2 |
| 169 | −1 | 0 | 3 | 2 |
| 170 | −1 | 1 | 2 | 2 |
| 171 | −1 | 2 | 1 | 2 |
| 172 | −1 | 3 | 0 | 2 |
| 173 | −1 | 4 | −1 | 2 |
| 174 | 1 | 2 | 1 | 4 |
| 175 | 2 | 2 | 1 | 5 |
| 176 | −4 | 2 | 2 | 0 |
| 177 | −3 | 2 | 2 | 1 |
| 178 | −2 | 2 | 2 | 2 |
| 179 | −1 | 2 | 2 | 3 |
| 180 | 0 | 2 | 2 | 4 |
| 181 | 1 | 2 | 2 | 5 |
| 182 | 2 | 2 | 2 | 6 |
| 183 | −2 | 4 | 0 | 2 |
| 184 | −4 | 3 | 2 | 1 |
| 185 | −3 | 3 | 2 | 2 |
| 186 | −2 | 3 | 2 | 3 |
| 187 | −1 | 3 | 2 | 4 |
| 188 | 0 | 3 | 2 | 5 |
| 189 | 1 | 3 | 2 | 6 |
| 190 | 2 | 3 | 2 | 7 |
| 191 | 3 | 3 | 2 | 8 |
| 192 | 4 | −4 | 1 | 1 |
| 193 | 4 | −3 | 0 | 1 |
| 194 | 4 | −2 | −1 | 1 |
| 195 | 4 | −1 | −2 | 1 |
| 196 | 4 | 0 | −3 | 1 |
| 197 | 4 | 1 | −4 | 1 |
| 198 | 3 | 0 | −3 | 0 |
| 199 | 3 | 1 | −4 | 0 |
| 200 | 4 | −4 | 3 | 3 |
| 201 | 4 | −3 | 2 | 3 |
| 202 | 4 | −2 | 1 | 3 |
| 203 | 4 | −1 | 0 | 3 |
| 204 | 4 | 0 | −1 | 3 |
| 205 | 4 | 1 | −2 | 3 |
| 206 | 4 | 2 | −3 | 3 |
| 207 | 4 | 3 | −4 | 3 |

TABLE 1-continued

| Byte | Code | | | Wt |
|---|---|---|---|---|
| 208 | 3 | −4 | 4 | 3 |
| 209 | 3 | −3 | 3 | 3 |
| 210 | 3 | −2 | 2 | 3 |
| 211 | 3 | −1 | 1 | 3 |
| 212 | 3 | 4 | −4 | 3 |
| 213 | 3 | 1 | −1 | 3 |
| 214 | 3 | 2 | −2 | 3 |
| 215 | 3 | 3 | −3 | 3 |
| 216 | 2 | −3 | 4 | 3 |
| 217 | 2 | −2 | 3 | 3 |
| 218 | 2 | −1 | 2 | 3 |
| 219 | 2 | 0 | 1 | 3 |
| 220 | 2 | 1 | 0 | 3 |
| 221 | 2 | 2 | −1 | 3 |
| 222 | 2 | 3 | −2 | 3 |
| 223 | 2 | 4 | −3 | 3 |
| 224 | 1 | −2 | 4 | 3 |
| 225 | 1 | −1 | 3 | 3 |
| 226 | 1 | 0 | 2 | 3 |
| 227 | 1 | 1 | 1 | 3 |
| 228 | 1 | 2 | 0 | 3 |
| 229 | 1 | 3 | −1 | 3 |
| 230 | 1 | 4 | −2 | 3 |
| 231 | 2 | 3 | −1 | 4 |
| 232 | 0 | −1 | 4 | 3 |
| 233 | 0 | 0 | 3 | 3 |
| 234 | 0 | 1 | 2 | 3 |
| 235 | 0 | 2 | 1 | 3 |
| 236 | 0 | 3 | 0 | 3 |
| 237 | 0 | 4 | −1 | 3 |
| 238 | 1 | 3 | 0 | 4 |
| 239 | 2 | 3 | 0 | 5 |
| 240 | −4 | 3 | 1 | 0 |
| 241 | −3 | 3 | 1 | 1 |
| 242 | −2 | 3 | 1 | 2 |
| 243 | −1 | 3 | 1 | 3 |
| 244 | 0 | 3 | 1 | 4 |
| 245 | 1 | 3 | 1 | 5 |
| 246 | 2 | 3 | 1 | 6 |
| 247 | −1 | 4 | 0 | 3 |
| 248 | −4 | 4 | 1 | 1 |
| 249 | −3 | 4 | 1 | 2 |
| 250 | −2 | 4 | 1 | 3 |
| 251 | −1 | 4 | 1 | 4 |
| 252 | 0 | 4 | 1 | 5 |
| 253 | 1 | 4 | 1 | 6 |
| 254 | 2 | 4 | 1 | 7 |
| 255 | 3 | 4 | 1 | 8 |

Each entry in Table 1 comprises three parts: the value of the eight-bit word in decimal; the values of the three nonary symbols which together form the code word for that eight-bit word; and the 'weight' of that encoded value. This weight is derived for each encoded value by summing the individual nonary symbols making up that encoded value. Thus the nonary code word for the eight-bit value decimal 201 (binary 11001001) is the triplet of symbols (4, −3, 2), and the associated weight is 4−3+2=3.

The weight is significant in relation to the desirability of maintaining d.c. balance on the twisted-pair conductor 16, to avoid sustained presence of voltage offsets on the conductor. The presence of such offsets for extended periods causes difficulties in systems using transformer coupling (e.g. for electrical safety reasons) and must therefore be avoided. The weight for each encoded value is used to keep such offsets within predetermined limits. The encoder 30 contains a counter which maintains a cumulative sum (sometimes known as a running digital sum or r.d.s.) of the weights of all code words transmitted over the conductor 16. As each successive eight-bit value is encoded, its associated weight as listed in Table 1 (or whether its weight is greater than zero or not) is compared with this cumulative sum. If the cumulative sum is positive and the weight of the code word is nonzero, the code word (and thus its weight) is inverted. For example, the code word for the eight-bit value decimal 201 would in this case become the triplet (−4, 3, −2), with a weight of −3.

An advantageous property of the code defined by Table 1 is that the weight of any code word is constrained to be less than or equal to 8. This constraint on code word weight further assists in minimising voltage offsets on the conductor. An arbitrary choice of 8B3N code might result in code words with weight 12.

It will be apparent from FIG. 1 that the eight-bit values which are used as control words are a subset of the eight-bit data word values, specifically those in which the three most significant digits are zero (i.e. with byte values from 0 to 31). In addition, it can be seen from Table 1 that all the control words in this subset have nonary code words with a weight of zero. A single corruption of any magnitude (i.e. affecting any single nonary symbol) can never produce another encoded value of zero weight i.e. these code words are separated by a Hamming distance of 2. The use of this subset to represent control words helps to reduce the risk of a valid control word being corrupted in such a way as to produce another valid but incorrect control word. This risk may be further reduced by requiring that a control word must occur twice (or more) in succession before it is accepted as being valid.

It should be noted that the actual eight-bit value applied to the encoder 30 for each successive control word will not be the specific, fixed value for that control word appearing at the inputs to the multiplexer 20. This value will be scrambled by the scrambler 22, so that that generally a different value will be applied to the encoder 30 for each successive occurrence of a particular control word. Nonetheless, in view of the bitwise side-stream operation of the scrambler 22, whereby the transformation of each bit at the input to the scrambler is independent of the other input bits, it is possible to substitute zeroes for the three most significant bits of the scrambler output, to ensure that an encoded value in the desired subset is used, and still have the original control word value recovered at the output of the descrambler 48 in the receiver 14.

With the encoding shown in Table 1, the delimiters may be for example the triplets of symbols (4, 4, 4) and (−4, −4, −4). A single corruption of any magnitude affecting any one of the symbols in these triplets cannot change the triplet into a valid code word representing a data word or a control word.

Figure 3:
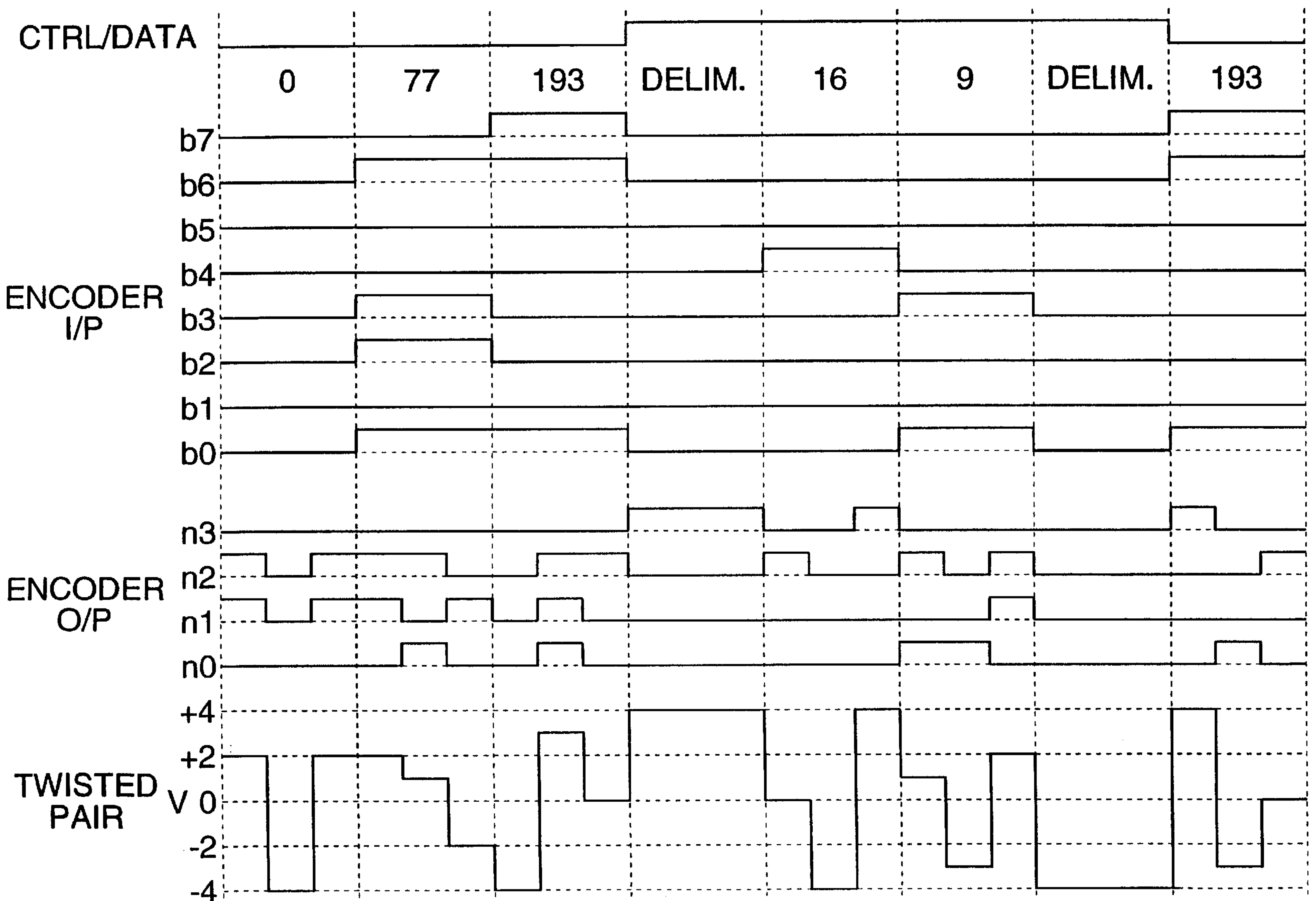
FIG. 3 is a waveform diagram showing waveforms at various points in the apparatus of FIG. 1.

FIG. 3 shows waveforms which would appear at the input and output of the encoder 30 and on the twisted-pair conductor 16 for a succession of data and control words. The uppermost line indicates the status of the CONTROL/DATA selection signal (value 1 indicating that Control signals are to be transmitted); the next eight lines shows the input signals to the encoder 30, and the following four lines show its four output signals; the lowermost line shows the nine-level signal appearing on the conductor 16. It is assumed that the nonary values −4 to +4 are represented at the output of the encoder 30 by the nibbles 0000 to 1000 respectively; thus the nonary value 0, for example, is represented by the nibble 0100. It should be noted that other choices may be made for the correspondence between the nonary symbol values and the nibble values, and the nibble values used need not form a contiguous sequence.

Referring to FIG. 3, the first three words transmitted are data words, with (scrambled) values in decimal of 0, 77 and 193 respectively. From Table 1 it can be seen that the code word for the value 0 is (2, −4, 2), so the output of the encoder 30 is the sequence of nibbles 0110, 0000, 0110, providing the required voltage levels on the conductor 16. The weight of this code word is 0 so, assuming the r.d.s. up to this point is 0, it remains at 0. The code word for the value 77 is (2, 1, −2) and the appropriate nibbles are output by the encoder 30 to control the D/A Converter 34 to produce these voltages; the weight of this code word is 1, and the r.d.s therefore becomes 1. The code word for the value 193 is (4, −3, 0) and the associated weight is 1; therefore the code word is inverted, to produce (−4, 3, 0) and reduce the r.d.s. back towards (and in this case to) zero.

These three data words are followed by a repeated control word, and the CONTROL/DATA selection signal therefore changes state. This causes the multiplexers 20 and 28 to select the control word input and to set the three most significant input bits for the scrambler 22 and the encoder 30 to zero. In addition the insertion module 32 inserts a delimiter, chosen if necessary to change the r.d.s towards zero, into the stream of nibbles supplied to the D/A Converter 34. In this case the chosen delimiter is the symbol triplet (4, 4, 4), changing the r.d.s. to +12.

The delimiter is followed by the first occurrence of the control word, in this case with a scrambled value of decimal 16. The corresponding code word (0, −4, 4) is therefore transmitted on the conductor 16, with no change in the r.d.s. The second occurrence of the control word in this case has a scrambled value of 9, producing the code word (1, −3, 2), and this is followed by the delimiter indicating the end of the control word sequence and the resumption of the data words. To change the r.d.s back to zero, the delimiter is transmitted in its inverted form (−4, −4, −4).

The first subsequent data word has a scrambled value of decimal 193, the same as for the third data word. In this case, as the r.d.s. is not positive, the relevant code word (4, −3, 0) is transmitted unchanged.

During reception of these signals by the receiver 14, the decoder 46 maintains a count of the r.d.s. in the same manner as the encoder 30. The decoder 46 can thus confirm whether each encoded value as received is appropriate to change the r.d.s. towards zero when necessary. If a code word is received which has not been inverted when it should have been, or if a code word not derived from Table 1 is encountered, the decoder 46 can determine that corruption of the signals on the conductor 16 has occurred.

Similarly, the error detection module 44 can confirm that each received delimiter has an appropriate value, i.e. (4, 4, 4) or (−4, 4, −4), and that the code words received between pairs of delimiters (i.e. for control words) have a weight of zero and encode for byte values between 0 and 31. Any discrepancy indicates corruption of the signals traversing the conductor 16.

When the CONTROL/DATA selection signal in the transmitter 12 indicates that data words are being processed, the insertion module 32 generates a check code for the sequence of encoded data words produced by the 8B3N encoder 30. This may be accomplished, for example, by applying a known cyclic redundancy check (CRC) code algorithm to each of the encoder's output bit streams n0 to n3 (FIG. 3) independently. Thus a separate CRC value can be produced for each of these bit streams, and incorporated into the signals transmitted over the conductor 16 after each data packet.

During processing of data words, the error detection module 44 likewise generates a CRC value for each bit stream n0 to n3 supplied by the A/D Converter 42, and compares its calculated CRC values with those received via the conductor 16. Any discrepancy indicates that corruption of the transmitted signals has occurred. These CRC checks on the output bit streams from the encoder 30 would typically be in addition to any CRC checks applied to data as received by the multiplexer 20.

It is typically not feasible to apply CRC checks to the control words, because they are not gathered into any particular kind of grouping (analogous to a frame or packet of data) to which a CRC code can be applied. The use for control signalling of a selected subset of data words thus provides error detection which would otherwise be lacking. Treating the control words in the same general manner as data words as described above (i.e. scrambling and encoding them) has the advantage of avoiding problems associated with d.c. balance and repetition of bit patterns (such a excessive radiated emissions) which could occur if control words were applied directly to the conductor 16. This in turn permits greater freedom in selection of the encoding of the control words, to enhance error detection in respect of them.

The encoder 30, insertion module 32, error detection module 44 and decoder 46 may be implemented, for example, using look-up tables held in read-only memory or using digital logic circuitry. Alternatively they may be implemented using stored program instructions to control the operation of a processor to derive the required values from logical formulae defining the required properties of the encoding and error detection techniques.

The code defined in Table 1 is designed to have several advantageous properties. These relate in part to the provision of robust 'escape patterns', that is patterns of code symbols which can never occur within a sequence of symbols representing any possible data words. Escape patterns are useful for communicating information and commands relating to the communication apparatus itself over the same channel as data. The control word delimiters (4, 4, 4) and (−4, −4, −4) described above are examples of escape patterns.

In implementing escape patterns in a block code (i.e. a code in which every code word has the same length), it is desirable to have escape patterns which remain distinguishable from symbol sequences for data words even if block synchronization between the two ends of the communications channel is lost (i.e. if at least one end of the channel misidentifies the boundary between successive code words). Thus each escape pattern must be different from any code word corresponding to possible data words, and must not occur within any concatenation of such code words.

As noted above, it is also desirable that corruption of signals should not readily change an escape pattern into a valid code word for a data word, or vice versa. The degree of resilience of a code to such corruption may be measured in terms of its 'Hamming distance', which in the context of escape patterns is defined as the minimum number of symbols which must be altered for a symbol sequence representing data to become identical to an escape pattern, or vice versa.

A further desirable feature of a block code used as part of a system for transmitting data over unshielded twisted pairs (and other media) is that the output of the block code has the lowest possible energy content. Block codes having low energy content can allow compliance with radiated emissions regulations to be more easily achieved.

A block code providing escape patterns with a Hamming distance H from any code word for data, even in the case of loss of block synchronization, and having relatively low energy content, is defined by the following procedure.

Procedure For Block Code Design

The block code will have an output consisting of code words each containing Y characters, each character being taken from the set of n possible symbols $S=\{s_1, S_2, \ldots s_n\}$. The set C of all possible sequences of length Y of these symbols has $n_Y$ elements. The code words representing data constitute a subset D of this set C. In the case of the block code in Table 1, for example, Y=3, n=9, S comprises the set of nonary symbols −4 to 4 and the set C contains 729 combinations of symbols, of which the 256 listed in Table 1 form the subset D.

One symbol in the set of symbols S, say $s_e$, is chosen and the escape pattern is defined as Y occurrences of that symbol $s_e$ (i.e. a code word comprised solely of $s_e$ symbols). The set D of data code words is then constructed such that no code word in D has more than (Y−H ) occurrences of the symbol $s_e$; all code words in the set D will then have a Hamming distance of at least H from the escape pattern. Thus, in the case of the encoding in Table 1 it can be seen that no code word contains more than one occurrence of the nonary symbols 4 and -4; with delimiter escape patterns of (4, 4, 4) and (−4, −4, −4) the Hamming distance between code words and escape patterns is therefore 2.

In order to ensure that an escape pattern remains different from a code word for data even if block synchronization is lost, the values of Y and H are chosen such that 2H>Y.

If it is desired to use more than one symbol to form escape patterns, a subset $S_E$ of symbols for such use is selected from the overall set S. Provided all code words for data in the set D contain no more than (Y−H) occurrences of symbols which are in the set $S_E$, an escape pattern of length Y and composed entirely of symbols in the set $S_e$, will have a Hamming distance of at least H from the code words in the set D.

In order to achieve low energy content, the symbol(s) selected to form any subset $S_E$ are those having large magnitude. Since no more than (Y−H) occurrences of any symbol in the set $S_E$, are contained in any data or control code word, the output of the code will, on average, contain fewer of these symbols than symbols not contained in the subset $S_E$. Selecting the symbols having large magnitude for the set $S_E$, therefore reduces the energy content of the code below that of an arbitrarily chosen code. Thus, in the case of the encoding shown in Table 1, the absence of any code words having more than one occurrence of the symbol 4 or more than one occurrence of the symbol −4 serves to reduce the energy content of the code in addition to allowing escape patterns to be formed. Whilst the design of the code in the manner described here results in escape patterns having relatively high energy, these escape patterns are generally transmitted infrequently.

A further example of a code defined by this procedure is shown in Table 2 below.

TABLE 2

| Byte | | Code | | Wt |
|---|---|---|---|---|
| 0 | −4 | 1 | 3 | 0 |
| 1 | −4 | 2 | 2 | 0 |
| 2 | −4 | 3 | 1 | 0 |
| 3 | −3 | −1 | 4 | 0 |
| 4 | −3 | 0 | 3 | 0 |
| 5 | −3 | 1 | 2 | 0 |
| 6 | −3 | 2 | 1 | 0 |
| 7 | −3 | 3 | 0 | 0 |
| 8 | −3 | 4 | −1 | 0 |
| 9 | −2 | −2 | 4 | 0 |
| 10 | −2 | −1 | 3 | 0 |
| 11 | −2 | 0 | 2 | 0 |
| 12 | −2 | 1 | 1 | 0 |
| 13 | −2 | 2 | 0 | 0 |

TABLE 2-continued

| Byte | Code | | | Wt |
|---|---|---|---|---|
| 14 | −2 | 3 | −1 | 0 |
| 15 | −2 | 4 | −2 | 0 |
| 16 | −1 | −3 | 4 | 0 |
| 17 | −1 | −2 | 3 | 0 |
| 18 | −1 | −1 | 2 | 0 |
| 19 | −1 | 0 | 1 | 0 |
| 20 | −1 | 1 | 0 | 0 |
| 21 | −1 | 2 | −1 | 0 |
| 22 | −1 | 3 | −2 | 0 |
| 23 | −1 | 4 | −3 | 0 |
| 24 | 0 | −3 | 3 | 0 |
| 25 | 0 | −2 | 2 | 0 |
| 26 | 0 | −1 | 1 | 0 |
| 27 | 0 | 1 | −1 | 0 |
| 28 | 0 | 2 | −2 | 0 |
| 29 | 0 | 3 | −3 | 0 |
| 30 | 1 | −4 | 3 | 0 |
| 31 | 1 | −3 | 2 | 0 |
| 32 | 1 | −2 | 1 | 0 |
| 33 | 1 | −1 | 0 | 0 |
| 34 | 1 | 0 | −1 | 0 |
| 35 | 1 | 1 | −2 | 0 |
| 36 | 1 | 2 | −3 | 0 |
| 37 | 1 | 3 | −4 | 0 |
| 38 | 2 | −4 | 2 | 0 |
| 39 | 2 | −3 | 1 | 0 |
| 40 | 2 | −2 | 0 | 0 |
| 41 | 2 | −1 | −1 | 0 |
| 42 | 2 | 0 | −2 | 0 |
| 43 | 2 | 1 | −3 | 0 |
| 44 | 2 | 2 | −4 | 0 |
| 45 | 3 | −4 | 1 | 0 |
| 46 | 3 | −3 | 0 | 0 |
| 47 | 3 | −2 | −1 | 0 |
| 48 | 3 | −1 | −2 | 0 |
| 49 | 3 | 0 | −3 | 0 |
| 50 | 3 | 1 | −4 | 0 |
| 51 | 4 | −3 | −1 | 0 |
| 52 | 4 | −2 | −2 | 0 |
| 53 | 4 | −1 | −3 | 0 |
| 54 | −4 | 2 | 3 | 1 |
| 55 | −4 | 3 | 2 | 1 |
| 56 | −3 | 0 | 4 | 1 |
| 57 | −3 | 1 | 3 | 1 |
| 58 | −3 | 2 | 2 | 1 |
| 59 | −3 | 3 | 1 | 1 |
| 60 | −3 | 4 | 0 | 1 |
| 61 | −2 | −1 | 4 | 1 |
| 62 | −2 | 0 | 3 | 1 |
| 63 | −2 | 1 | 2 | 1 |
| 64 | −2 | 2 | 1 | 1 |
| 65 | −2 | 3 | 0 | 1 |
| 66 | −2 | 4 | −1 | 1 |
| 67 | −1 | −2 | 4 | 1 |
| 68 | −1 | −1 | 3 | 1 |
| 69 | −1 | 0 | 2 | 1 |
| 70 | −1 | 1 | 1 | 1 |
| 71 | −1 | 2 | 0 | 1 |
| 72 | −1 | 3 | −1 | 1 |
| 73 | −1 | 4 | −2 | 1 |
| 74 | 0 | −3 | 4 | 1 |
| 75 | 0 | −2 | 3 | 1 |
| 76 | 0 | −1 | 2 | 1 |
| 77 | 0 | 0 | 1 | 1 |
| 78 | 0 | 1 | 0 | 1 |
| 79 | 0 | 2 | −1 | 1 |
| 80 | 0 | 3 | −2 | 1 |
| 81 | 0 | 4 | −3 | 1 |
| 82 | 1 | −3 | 3 | 1 |
| 83 | 1 | −2 | 2 | 1 |
| 84 | 1 | −1 | 1 | 1 |
| 85 | 1 | 0 | 0 | 1 |
| 86 | 1 | 1 | −1 | 1 |
| 87 | 1 | 2 | −2 | 1 |
| 88 | 1 | 3 | −3 | 1 |
| 89 | 2 | −4 | 3 | 1 |
| 90 | 2 | −3 | 2 | 1 |

TABLE 2-continued

| Byte | Code | | | Wt |
|---|---|---|---|---|
| 91 | 1 | −2 | 1 | 1 |
| 92 | 2 | −1 | 0 | 1 |
| 93 | 2 | 0 | −1 | 1 |
| 94 | 2 | 1 | −2 | 1 |
| 95 | 2 | 2 | −3 | 1 |
| 96 | 2 | 3 | −4 | 1 |
| 97 | 3 | −4 | 2 | 1 |
| 98 | 3 | −3 | 1 | 1 |
| 99 | 3 | −2 | 0 | 1 |
| 100 | 3 | −1 | −1 | 1 |
| 101 | 3 | 0 | −2 | 1 |
| 102 | 3 | 1 | −3 | 1 |
| 103 | 3 | 2 | −4 | 1 |
| 104 | 4 | −3 | 0 | 1 |
| 105 | 4 | −2 | −1 | 1 |
| 106 | 4 | −1 | −2 | 1 |
| 107 | 4 | 0 | −3 | 1 |
| 108 | −3 | 1 | 4 | 2 |
| 109 | −3 | 2 | 3 | 2 |
| 110 | −3 | 3 | 2 | 2 |
| 111 | −3 | 4 | 1 | 2 |
| 112 | −2 | 0 | 4 | 2 |
| 113 | −2 | 1 | 3 | 2 |
| 114 | −2 | 3 | 1 | 2 |
| 115 | −2 | 4 | 0 | 2 |
| 116 | −1 | −1 | 4 | 2 |
| 117 | −1 | 0 | 3 | 2 |
| 118 | −1 | 1 | 2 | 2 |
| 119 | −1 | 2 | 1 | 2 |
| 120 | −1 | 3 | 0 | 2 |
| 121 | −1 | 4 | −1 | 2 |
| 122 | 0 | −2 | 4 | 2 |
| 123 | 0 | −1 | 3 | 2 |
| 124 | 0 | 0 | 2 | 2 |
| 125 | 0 | 1 | 1 | 2 |
| 126 | 0 | 2 | 0 | 2 |
| 127 | 0 | 3 | −1 | 2 |
| 128 | 0 | 4 | −2 | 2 |
| 129 | 1 | −3 | 4 | 2 |
| 130 | 1 | −2 | 3 | 2 |
| 131 | 1 | −1 | 2 | 2 |
| 132 | 1 | 0 | 1 | 2 |
| 133 | 1 | 1 | 0 | 2 |
| 134 | 1 | 2 | −1 | 2 |
| 135 | 1 | 3 | −2 | 2 |
| 136 | 1 | 4 | −3 | 2 |
| 137 | 2 | −3 | 3 | 2 |
| 138 | 2 | −1 | 1 | 2 |
| 139 | 2 | 0 | 0 | 2 |
| 140 | 2 | 1 | −1 | 2 |
| 141 | 2 | 3 | −3 | 2 |
| 142 | 3 | −3 | 2 | 2 |
| 143 | 3 | −2 | 1 | 2 |
| 144 | 3 | −1 | 0 | 2 |
| 145 | 3 | 0 | −1 | 2 |
| 146 | 3 | 1 | −2 | 2 |
| 147 | 3 | 2 | −3 | 2 |
| 148 | 4 | −3 | 1 | 2 |
| 149 | 4 | −2 | 0 | 2 |
| 150 | 4 | −1 | −1 | 2 |
| 151 | 4 | 0 | −2 | 2 |
| 152 | 4 | 1 | −3 | 2 |
| 153 | −3 | 2 | 4 | 3 |
| 154 | −3 | 4 | 2 | 3 |
| 155 | −2 | 1 | 4 | 3 |
| 156 | −2 | 2 | 3 | 3 |
| 157 | −2 | 3 | 2 | 3 |
| 158 | −2 | 4 | 1 | 3 |
| 159 | −1 | 0 | 4 | 3 |
| 160 | −1 | 1 | 3 | 3 |
| 161 | −1 | 2 | 2 | 3 |
| 162 | −1 | 3 | 1 | 3 |
| 163 | −1 | 4 | 0 | 3 |
| 164 | 0 | −1 | 4 | 3 |
| 165 | 0 | 0 | 3 | 3 |
| 166 | 0 | 1 | 2 | 3 |
| 167 | 0 | 2 | 1 | 3 |

TABLE 2-continued

| Byte | Code | | | Wt |
|---|---|---|---|---|
| 168 | 0 | 3 | 0 | 3 |
| 169 | 0 | 4 | −1 | 3 |
| 170 | 1 | −2 | 4 | 3 |
| 171 | 1 | −1 | 3 | 3 |
| 172 | 1 | 0 | 2 | 3 |
| 173 | 1 | 2 | 0 | 3 |
| 174 | 1 | 3 | −1 | 3 |
| 175 | 1 | 4 | −2 | 3 |
| 176 | 2 | −3 | 4 | 3 |
| 177 | 2 | −2 | 3 | 3 |
| 178 | 2 | −1 | 2 | 3 |
| 179 | 2 | 0 | 1 | 3 |
| 180 | 2 | 1 | 0 | 3 |
| 181 | 2 | 2 | −1 | 3 |
| 182 | 2 | 3 | −2 | 3 |
| 183 | 2 | 4 | −3 | 3 |
| 184 | 3 | −2 | 2 | 3 |
| 185 | 3 | −1 | 1 | 3 |
| 186 | 3 | 0 | 0 | 3 |
| 187 | 3 | 1 | −1 | 3 |
| 188 | 3 | 2 | −2 | 3 |
| 189 | 4 | −3 | 2 | 3 |
| 190 | 4 | −2 | 1 | 3 |
| 191 | 4 | −1 | 0 | 3 |
| 192 | 4 | 0 | −1 | 3 |
| 193 | 4 | 1 | −2 | 3 |
| 194 | 4 | 2 | −3 | 3 |
| 195 | −2 | 2 | 4 | 4 |
| 196 | −2 | 4 | 2 | 4 |
| 197 | −1 | 1 | 4 | 4 |
| 198 | −1 | 2 | 3 | 4 |
| 199 | −1 | 3 | 2 | 4 |
| 200 | −1 | 4 | 1 | 4 |
| 201 | 0 | 0 | 4 | 4 |
| 202 | 0 | 1 | 3 | 4 |
| 203 | 0 | 2 | 2 | 4 |
| 204 | 0 | 3 | 1 | 4 |
| 205 | 0 | 4 | 0 | 4 |
| 206 | 1 | −1 | 4 | 4 |
| 207 | 1 | 0 | 3 | 4 |
| 206 | 1 | 1 | 2 | 4 |
| 209 | 1 | 2 | 1 | 4 |
| 210 | 1 | 3 | 0 | 4 |
| 211 | 1 | 4 | −1 | 4 |
| 212 | 2 | −2 | 4 | 4 |
| 213 | 2 | −1 | 3 | 4 |
| 214 | 2 | 0 | 2 | 4 |
| 215 | 2 | 1 | 1 | 4 |
| 216 | 2 | 2 | 0 | 4 |
| 217 | 2 | 3 | −1 | 4 |
| 218 | 2 | 4 | −2 | 4 |
| 219 | 3 | −1 | 2 | 4 |
| 220 | 3 | 0 | 1 | 4 |
| 221 | 3 | 1 | 0 | 4 |
| 222 | 3 | 2 | −1 | 4 |
| 223 | 4 | −2 | 2 | 4 |
| 224 | 4 | −1 | 1 | 4 |
| 225 | 4 | 0 | 0 | 4 |
| 226 | 4 | 1 | −1 | 4 |
| 227 | 4 | 2 | −2 | 4 |
| 228 | −2 | 3 | 4 | 5 |
| 229 | −2 | 4 | 3 | 5 |
| 230 | −1 | 2 | 4 | 5 |
| 231 | −1 | 4 | 2 | 5 |
| 232 | 0 | 1 | 4 | 5 |
| 233 | 0 | 2 | 3 | 5 |
| 234 | 0 | 3 | 2 | 5 |
| 235 | 0 | 4 | 1 | 5 |
| 236 | 1 | 0 | 4 | 5 |
| 237 | 1 | 1 | 3 | 5 |
| 238 | 1 | 2 | 2 | 5 |
| 239 | 1 | 3 | 1 | 5 |
| 240 | 1 | 4 | 0 | 5 |
| 241 | 2 | −1 | 4 | 5 |
| 242 | 2 | 0 | 3 | 5 |
| 243 | 2 | 1 | 2 | 5 |
| 244 | 2 | 2 | 1 | 5 |

TABLE 2-continued

| Byte | Code | | | Wt |
|---|---|---|---|---|
| 245 | 2 | 3 | 0 | 5 |
| 246 | 2 | 4 | −1 | 5 |
| 247 | 3 | −2 | 4 | 5 |
| 248 | 3 | 0 | 2 | 5 |
| 249 | 3 | 1 | 1 | 5 |
| 250 | 3 | 2 | 0 | 5 |
| 251 | 3 | 4 | −2 | 5 |
| 252 | 4 | −2 | 3 | 5 |
| 253 | 4 | −1 | 2 | 5 |
| 254 | 4 | 0 | 1 | 5 |
| 255 | 4 | 1 | 0 | 5 |
| — | 4 | 2 | −1 | 5 |
| — | 4 | 3 | −2 | 5 |

Each entry in Table 2 comprises three parts: the value of the eight-bit word in decimal; the values of the three nonary symbols which together form the code word for that eight-bit word; and the 'weight' of that encoded value. The last two rows of Table 2 contain two code words and their respective weights, which are not mapped to any eight bit word, but which also have the properties described below. An allowed modification of the code is for these code words to be substituted for two other code words that are mapped to eight bit words having values greater than decimal 31.

The code defined by Table 2 has the following properties. No code word contains more than one symbol which is a member of the subset of nonary symbols {4, −4}. No code word contains more than one occurrence of the nonary symbol 3. No code word contains more than one occurrence of the nonary symbol −3. Escape patterns which have Hamming distance of 2 from any code word defined in Table 2 are in this case composed of sequences of 3 nonary symbols chosen from the set {4, −4} or sequences of 3 nonary symbols chosen from the set {3} or sequences of 3 nonary symbols chosen from the set {−3}. Escape patterns with increased Hamming distance from code words may also be formed by concatenating such sequences.

The encoding shown in Table 2 also has no code word containing more than two nonary symbols which are members of the subset {2, −2}, and no code word containing more than two nonary symbols which are members of the subset {3, −3, 4, −4}. These properties serve to further reduce the energy content of the output of the code and also allow other escape patterns to be formed. Escape patterns which have Hamming distance of 1 from any code word defined in Table 2 are in this case composed of sequences of 3 nonary symbols chosen from the set {2, −2} or 3 nonary symbols chosen from the set {−3, 3, −4, 4}. Escape patterns with increased Hamming distance from code words may also be formed by concatenating such sequences.

Figure 4:
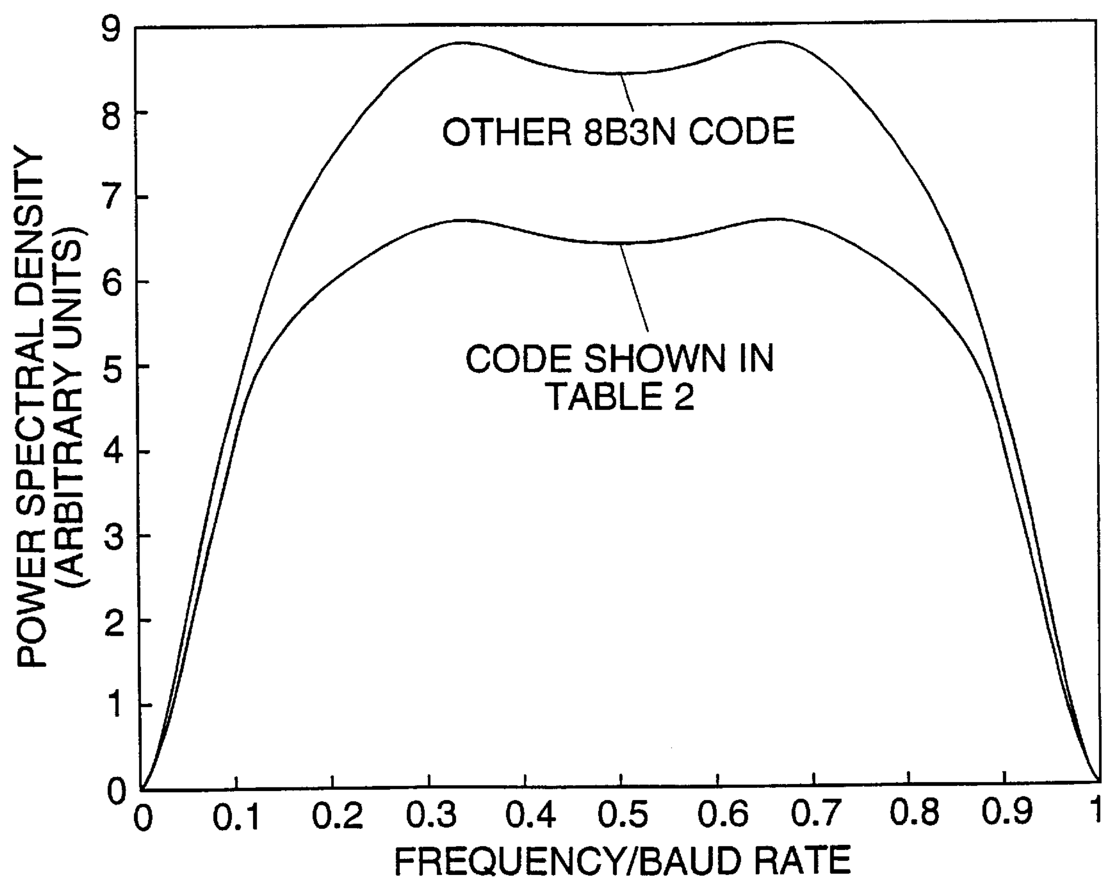
FIG. 4 is a graph showing the power spectral densities of two block codes.

The low energy content of the code shown in Table 2 is illustrated in FIG. 4 where the average power spectral density of the code shown in Table 2 is plotted alongside that of another 8B3N code not defined by the procedure above.

The code defined by Table 2 is used in the same manner as the code defined by Table 1, described above. With the encoding shown in Table 2, the delimiters may be for example the triplets of symbols (4, 4, −4) and (−4, −4, 4). A single corruption of any magnitude affecting any one of the symbols in these triplets cannot change the triplet into a valid code word representing a data word or a control word. It can be seen from Table 2 that all the control words (i.e. those inputs with decimal values from 0 to 31) have nonary code words with a weight of zero, providing the same advantageous properties for control code words as described above for the code defined by Table 1.

Various modifications to the apparatus described above are possible which result in an apparatus having similar functionality. One such modification relates to the use of four-bit nibbles to represent nonary symbols at the output of the coder 30 and the input to the D/A Converter 34. The use of any other signals to represent nonary symbols is permitted provided that a one to one mapping exists between those signals and the nonary symbols. For example, nonary symbols may be represented by binary words consisting of more than four bits are allowed, or by signals with varying voltage.

Similarly, a further allowed modification is for nonary symbols to be represented by signals other than four-bit nibbles at the output of the A/D Converter 42, and the input to the decoder 46, in the receiver 14.

Figure 5:
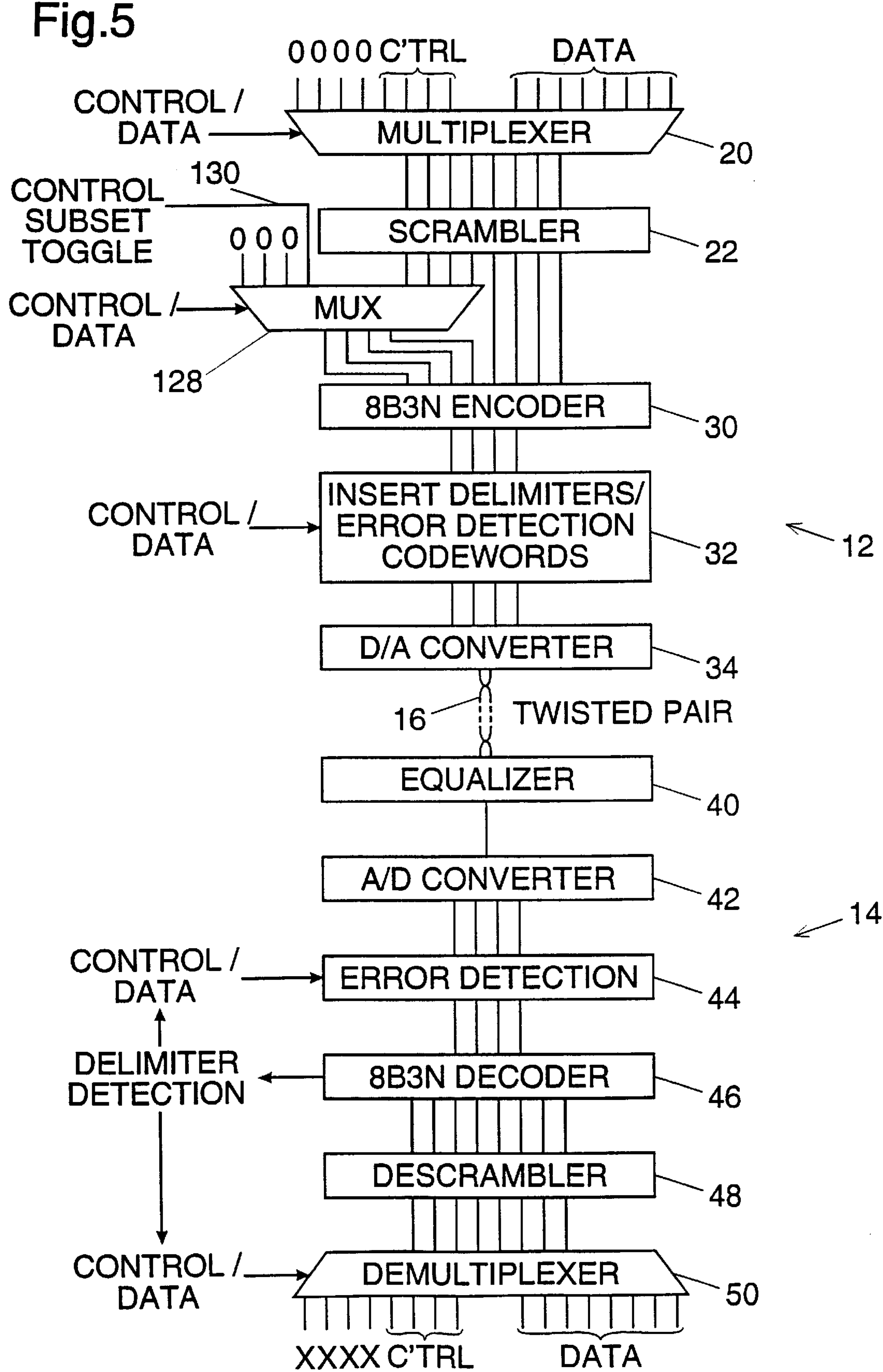
FIG. 5 is a block schematic diagram of a modified form of the apparatus.

Another modification is shown in FIG. 5. Referring to FIG. 5, the apparatus shown is virtually identical to that described above with reference to FIG. 1, as indicated by the use of like reference numerals. However, the multiplexer 20 now receives only four-bit control words, and there are four associated most significant bits which are forced to zero. Correspondingly, the three-bit multiplexer 28 of FIG. 1 is replaced by a four-bit multiplexer 128, which receives the four most significant bits of the scrambled bit stream from the scrambler 22. This multiplexer has the three most significant bits at its second input set to zero, while the fourth bit position of that second input receives a control subset toggle signal on a line 130.

The value of the control subset toggle signal is alternated between zero and one for each successive control word that is transmitted. As this signal supplies the value of the most significant bit of the five bits which are active in defining the value of control words, the effect of this toggling is to select consecutive code word values during control signalling from each of two subsets alternately of the overall set of thirty-two control words; one subset contains the sixteen control words with byte values 0 to 15, and the other subset contains the sixteen control words with byte values 16 to 31.

The error detection and decoding circuits 44 and 46 are arranged to check that received control words exhibit the same alternation between these two subsets; receipt of two successive control words from the same subset is indicative that an error in transmission has occurred. The demultiplexer 50 supplies four-bit control words at its output, and the four most significant bits of that output are ignored.

Dividing the set of control word values into two subsets used alternately in this manner can provide various benefits. It can be used to reduce the risk of a valid control word being corrupted in such a way as to produce another valid but incorrect control word. Because the first symbols of consecutive code words will always be different from one another, this technique can also be used to detect loss of block synchronization, by virtue of the code word errors which will result from such synchronization loss. In certain circumstances the alternate use of two subsets of code words can result in the energy of the transmitted signal being spread more uniformly against frequency.

It will be obvious to a person skilled in the art, given the encodings defined by Table 1 and Table 2, that additional encodings having the same properties may be derived therefrom by simple invariance transformations. As an example of such a transformation, the encoding may be transformed to an equivalent form by replacing the mapping between eight-bit binary words and code words of octary symbols, shown in Table 1 and Table 2, with any other one to one mapping.

Although the above description refers for simplicity to transmission of data over a single twisted-pair conductor, the invention may also be used for example for transmitting data over multiple twisted-pair conductors simultaneously, or for transmitting data over any other medium, such as coaxial cables or optical fiber waveguides.

We claim:

1. Apparatus for transmitting blocks of data over a channel together with control signals for coordinating access to said channel, said apparatus comprising:

a) means for generating said control signals from possible values of said blocks of data so that said control signals are spaced throughout a population of said possible values such that there is greater Hamming distance between said control signals than between data signals of said blocks of data; and b) means for transmitting said control signals between delimiter signals different from any data block input signals.

2. The apparatus of claim 1, including:

scrambler means for receiving and reversibly scrambling said data block input signals;

encoding means coupled to the scrambler means for deriving a code block for each respective scrambled data block in accordance with a code;

transmission means coupled to the encoding means for transmitting code blocks over said channel;

control means for generating and supplying said control signals to said scrambler means; and control means coupled to the transmission means and the encoding means for supplying encoded control signals to the transmission means between said delimiter signals, which differ from any of said data block input signals in scrambled and encoded form.

3. The apparatus of claim 1 wherein said means a) generates said control signals so that said control signals are spaced throughout the population of said possible values such that there is Hamming distance of at least 2 between said control signals.

4. The apparatus of claim 1, further including means for supplying error detection values to said transmission means, wherein operation of said supplying means is responsive to whether said transmission means is receiving encoded data blocks or encoded control signals.

5. The apparatus of claim 1, wherein means a) generates said control signals as control codewords selected from a group of control codewords, said group of control codewords comprising at least two subsets, and control codewords being selected from each subset in turn.

6. The apparatus of claim 5, wherein the two subsets are chosen so that the Hamming distance between control codewords in each subset is at least 2.

7. The apparatus of claim 1, further comprising means for encoding said data blocks using a code defined by the procedure described as "Procedure for block code design" herein.

8. The apparatus of claim 1, further comprising means for encoding said data blocks using the code defined in Table 1 herein or any invariance transformation thereof.

9. The apparatus of claim 1, further comprising means for encoding said data blocks using the code defined in Table 2 herein or any invariance transformation thereof.

10. Apparatus for transmitting blocks of data over a channel together with control signals coordinating access to said channel, comprising:

scrambler means for receiving and reversibly scrambling data block input signals;

encoding means coupled to the scrambler means for deriving a code block for each respective scrambled data block in accordance with a code;

transmission means coupled to the encoding means for transmitting code blocks over said channel;

control means for generating control signals and supplying said control signals to said scrambler means, said control signals being preselected ones of possible values of said data blocks; and control means coupled to the transmission means and the encoding means for supplying encoded control signals to the transmission means between delimiter signals different from any of said data block input signals in scrambled and encoded form.

11. The apparatus of claim 10, wherein said control signals are represented by control codewords selected form a group of control codewords, said group of control codewords comprising at least two subsets, and control codewords being selected from each subset in turn.

12. A method for transmitting blocks of data over a channel together with control signals for coordinating access to said channel, said method comprising the steps of:

generating said control signals from possible values of said blocks of data so that said control signals are spaced throughout a population of said possible values such that there is greater Hamming distance between said control signals than between data signals of said blocks of data; and transmitting said control signals between delimiter signals different from any data block input signals.

13. The method of claim 12, including the steps of:

receiving and reversibly scrambling said data block input signals;

deriving a code block for each respective scrambled data block in accordance with a code;

transmitting code blocks over said channel;

generating said control signals; and supplying encoded control signals to the transmission means between said delimiter signals, which differ from any of said data block input signals in scrambled and encoded form.

14. The method of claim 12, wherein said control signals are represented by control codewords selected from a group of control codewords, said group of control codewords comprising at least two subsets, and control codewords being selected from each subset in turn.

15. The method of claim 14, wherein the two subsets are chosen so that the Hamming distance between control codewords in each subset is at least 2.

16. The method of claim 12, wherein said data blocks are encoded using a code defined by the procedure described as ‘Procedure for block code design’ herein.

17. The method of claim 12, wherein said data blocks are encoded using the code defined in Table 1 herein or any invariance transformation thereof.

18. The method of claim 12, wherein said data blocks are encoded using the code defined in Table 2 herein or any invariance transformation thereof.

19. A method for transmitting blocks of data over a channel together with control signals coordinating access to said channel, comprising the steps of:

receiving and reversibly scrambling data block input signals;

deriving a code block for each respective scrambled data block in accordance with a code;

transmitting code blocks over said channel;

generating control signals, said control signals being preselected ones of possible values of said data blocks; and supplying encoded control signals to the transmission means between delimiter signals different from any of said data block input signals in scrambled and encoded form.

20. The method of claim 19, wherein said control signals are represented by control codewords selected from a group of control codewords, said group of control codewords comprising at least two subsets, and control codewords being selected from each subset in turn.

* * * * *